United States Patent
Park (10) Patent No.: US 9,172,440 B2
(45) Date of Patent: Oct. 27, 2015

(54) ANTENNA DEVICE OF MOBILE TERMINAL

(71) Applicant: Samsung Electronics Co. Ltd., Suwon-si, Gyeonggi-do (KR)

(72) Inventor: Sungryong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 13/862,806

(22) Filed: Apr. 15, 2013

(65) Prior Publication Data

US 2013/0273856 A1 Oct. 17, 2013

(30) Foreign Application Priority Data

Apr. 17, 2012 (KR) .......................... 10-2012-0039674

(51) Int. Cl.
*H04B 7/04* (2006.01)
*H04B 7/06* (2006.01)
*H04B 7/08* (2006.01)

(52) U.S. Cl.
CPC ............ *H04B 7/0404* (2013.01); *H04B 7/0602* (2013.01); *H04B 7/0802* (2013.01)

(58) Field of Classification Search
CPC ...... H01Q 1/246; H01Q 1/3833; H01Q 1/242
USPC ......... 455/562.1, 575.7, 13.3, 193.1; 343/876
See application file for complete search history.

(56) References Cited

U.S. PATENT DOCUMENTS

| | | | | |
|---|---|---|---|---|
| 6,442,376 | B1 * | 8/2002 | Furutani et al. | 455/82 |
| 6,766,149 | B1 * | 7/2004 | Hikita et al. | 455/83 |
| 6,804,200 | B1 * | 10/2004 | Burggraf et al. | 370/250 |
| 8,314,653 | B1 * | 11/2012 | Granger-Jones et al. | 327/553 |
| 2003/0003952 | A1 * | 1/2003 | Kim | 455/552 |
| 2003/0124982 | A1 * | 7/2003 | Saari et al. | 455/67.4 |
| 2004/0116098 | A1 * | 6/2004 | Ochii et al. | 455/333 |
| 2004/0217914 | A1 * | 11/2004 | Yamashita et al. | 343/850 |
| 2005/0231439 | A1 * | 10/2005 | Suwa et al. | 343/876 |
| 2005/0277387 | A1 * | 12/2005 | Kojima et al. | 455/78 |
| 2007/0077898 | A1 * | 4/2007 | Mueller et al. | 455/83 |
| 2007/0254692 | A1 * | 11/2007 | McCoy | 455/553.1 |
| 2010/0302123 | A1 * | 12/2010 | Knudsen et al. | 343/861 |
| 2011/0110452 | A1 * | 5/2011 | Fukamachi et al. | 375/267 |
| 2012/0315851 | A1 * | 12/2012 | Park | 455/41.2 |
| 2014/0295775 | A1 * | 10/2014 | Rousu et al. | 455/73 |

FOREIGN PATENT DOCUMENTS

KR 10-2010-0053371 A 5/2010

* cited by examiner

*Primary Examiner* — Minh D Dao
(74) *Attorney, Agent, or Firm* — Jefferson IP Law, LLP (57) ABSTRACT

An antenna device of a mobile terminal for enabling to receive a wireless signal of a new frequency band by appropriately connecting a plurality of antennas through a switch is provided. The antenna device includes a plurality of communication units for transmitting and receiving a wireless signal of a plurality of frequency bands through a plurality of antennas, a plurality of switches for turning on/off an electrical connection between the plurality of antennas and the plurality of communication units, and a controller for controlling the plurality of switches to turn off an electrical connection between the plurality of antennas and the plurality of communication units.

18 Claims, 6 Drawing Sheets

ANTENNA DEVICE OF MOBILE TERMINAL

PRIORITY

This application claims the benefit under 35 U.S.C. §119(a) of a Korean patent application filed on Apr. 17, 2012 in the Korean Intellectual Property Office and assigned Serial No. 10-2012-0039674, the entire disclosure of which is hereby incorporated by reference.

BACKGROUND OF THE INVENTION

1. Field of the Invention

The present invention relates to an antenna device of a mobile terminal. More particularly, the present invention relates to an antenna device of a mobile terminal for enabling reception of a wireless signal of a new frequency band by appropriately connecting a plurality of antennas through a switch.

2. Description of the Related Art

Nowadays, due to the remarkable development of information and communication technology, as well as semiconductor technology, the use of mobile terminals has rapidly increased and become widespread. A mobile terminal typically provides various functions. For example, the mobile terminal may provide a music reproduction function (e.g., MPEG audio layer-3 (MP3)), a photographing function, and a data communication function in addition to general mobile communication functions such as audio dedicated communication or reception and transmission of messages. More particularly, recent mobile terminals provide a plurality of wireless communication functions, for example a Global Positioning System (GPS) reception function, a Bluetooth communication function, a Wi-Fi communication function, a Wireless Broadband (WiBro) communication function, a digital broadcasting reception function (e.g., mobile broadcasting such as Digital Multimedia Broadcasting (DMB) or Digital Video Broadcasting (DVB)), an Internet connection function, and a location information providing function.

To support the various wireless communication functions of the mobile terminal, the mobile terminal includes a plurality of antennas. For example, the mobile terminal may include a mobile communication antenna for providing a mobile communication service, a GPS antenna for receiving a GPS signal, a Bluetooth antenna for Bluetooth communication, a Wi-Fi antenna for Wi-Fi communication, a broadcasting reception antenna for receiving digital broadcasting, a Frequency Modulation (FM) reception antenna for receiving FM radio, and a WiBro antenna for WiBro communication. However, as a plurality of antennas are mounted in the mobile terminal, the mobile terminal has difficulty in securing antenna mounting space and an antenna performance.

Therefore, a need exists for reducing the total number of antennas necessary to support the various functions provided by a mobile terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an antenna device of a mobile terminal for appropriately connecting a plurality of antennas through a switch and enabling the plurality of antennas to operate as a new antenna in a mobile terminal having the plurality of antennas.

Another aspect of the present invention is to provide an antenna device of a mobile terminal for providing an optimal wireless performance by selectively forming a wireless path with an antenna combination appropriate for a communication environment among combinable antennas.

In accordance with an aspect of the present invention, an antenna device of a mobile terminal is provided. The antenna device includes a first communication unit for transmitting and receiving a wireless signal of a first frequency band through a first antenna, a second communication unit for transmitting and receiving a wireless signal of a second frequency band through a second antenna, a third communication unit for transmitting and receiving a wireless signal of a third frequency band through a combination antenna generated by connecting the first antenna and the second antenna, a first switch for turning on/off an electrical connection between the first antenna and the first communication unit, a second switch for switching to electrically connect the second antenna and the second communication unit or the third communication unit, a third switch for turning on/off an electrical connection of the first antenna and the second antenna, and a controller for determining whether a signal for requesting activation of the third communication unit is input and for controlling, if a signal for requesting activation of the third communication unit is input, the first switch to turn off an electrical connection between the first antenna and the first communication unit, for controlling the second switch to turn on an electrical connection between the second antenna and the third communication unit, and for controlling the third switch to connect the first antenna and the second antenna.

In accordance with another aspect of the present invention, an antenna device of a mobile terminal is provided. The antenna device includes a first communication unit for transmitting and receiving a wireless signal of a first frequency band, a second communication unit for transmitting and receiving a wireless signal of a second frequency band, a third communication unit for transmitting and receiving a wireless signal of a third frequency band, a first antenna, a second antenna, a third antenna, a first switch for selectively connecting between the first antenna and one of the first communication unit, the second communication unit, and the third communication unit, a second switch for connecting between the first antenna and the second antenna, a third switch for connecting between the second antenna and the third antenna, and a controller for selectively operating the first switch, the second switch and the third switch depending on an operating mode of the mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
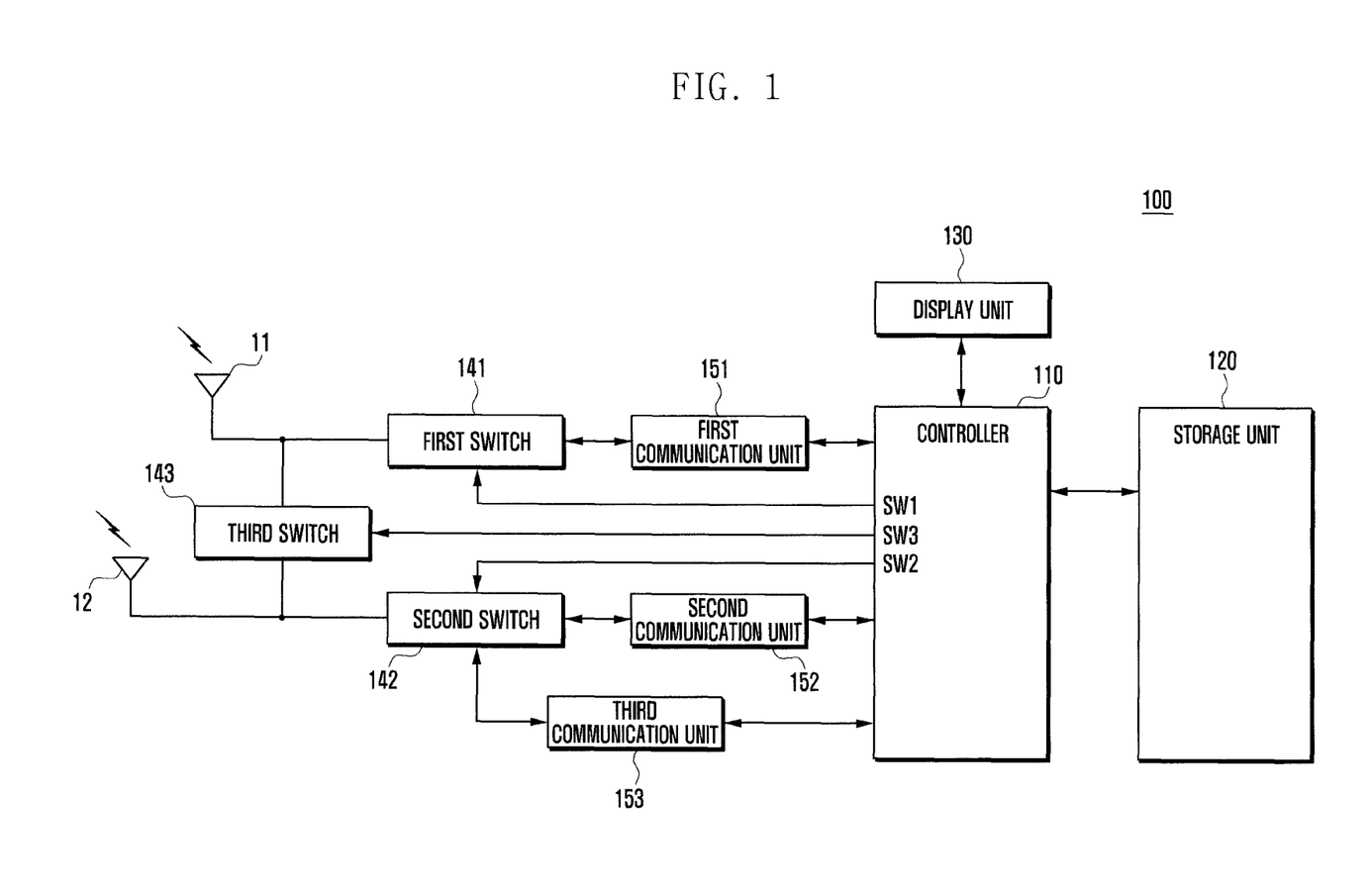
FIG. 1 is a block diagram illustrating a configuration of a mobile terminal according to a first exemplary embodiment of the present invention.
Figure 2:
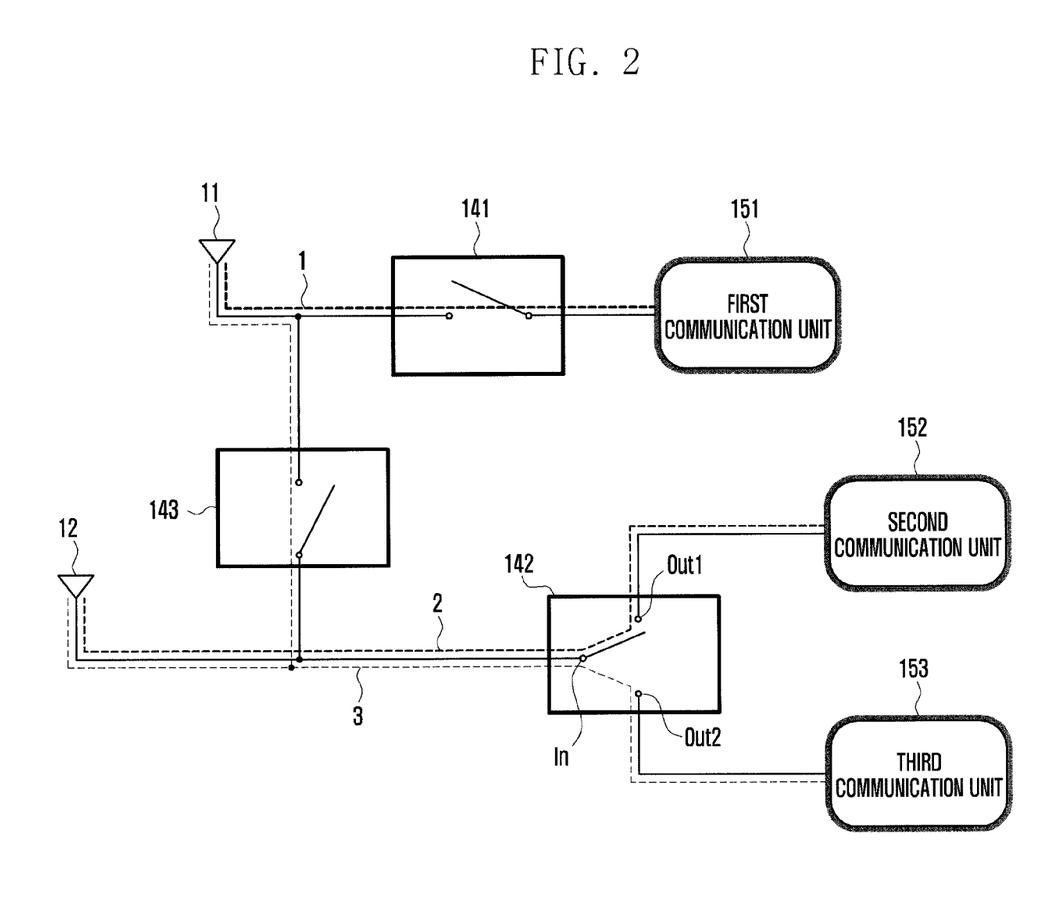
FIG. 2 is a diagram illustrating a first switch to a third switch of a mobile terminal, for example, the mobile terminal of FIG. 1, according to an exemplary embodiment of the present invention.

FIG. 1 is a block diagram illustrating a configuration of a mobile terminal according to a first exemplary embodiment of the present invention, and FIG. 2 is a diagram illustrating a first switch to a third switch of a mobile terminal, for example, the mobile terminal of FIG. 1, according to an exemplary embodiment of the present invention.

Referring to FIGS. 1 and 2, a mobile terminal 100 includes a first antenna 11, a second antenna 12, a controller 110, a storage unit 120, a display unit 130, a first switch 141, a second switch 142, a third switch 143, a first communication unit 151, a second communication unit 152, and a third communication unit 153.

The mobile terminal 100 having such a configuration connects the first antenna 11 for transmitting and receiving a wireless signal of a first frequency band and the second antenna 12 for transmitting and receiving a wireless signal of a second frequency band and provides a function for transmitting and receiving a wireless signal of a third frequency band.

Hereinafter, constituent elements of the mobile terminal 100 are described in more detail.

The first antenna 11 transmits and receives a wireless signal of a first frequency band. The second antenna 12 transmits and receives a wireless signal of a second frequency band. More particularly, the first antenna 11 is electrically connected to the first communication unit 151 or is separated from the first communication unit 151 by the first switch 141. The second antenna 12 is electrically connected to the second communication unit 152 or the third communication unit 153 or is separated from the second communication unit 152 or the third communication unit 153 by the second switch 142. Further, the first antenna 11 and the second antenna 12 are electrically connected or are separated by the third switch 143.

When the first antenna 11 and the second antenna 12 are connected by the third switch 143, the first antenna 11 and the second antenna 12 transmit and receive a wireless signal of the third frequency band. Here, the first antenna 11 may be an antenna for Bluetooth communication, and the second antenna 12 may be an antenna for receiving a Global Positioning System (GPS) signal. A combination antenna of the first antenna 11 and the second antenna 12 may be an antenna for mobile communication. More specifically, the GPS antenna generally has an antenna length of about 35 mm, and the Bluetooth antenna has an antenna length of about 30 mm. Further, the mobile communication (GSM 900) antenna requires an antenna length of about 70 mm. Therefore, when the GPS antenna and the Bluetooth antenna are connected, the connected antenna may be used as the mobile communication antenna. In this way, as a plurality of antennas are selectively connected and used, the number of antennas required to be included in the mobile terminal may be reduced.

However, the present invention is not limited to the above-described example. That is, the first antenna 11 and the second antenna 12 may be one of a mobile communication antenna, a GPS antenna, a short range wireless communication antenna, a WiBro antenna, an FM radio antenna, and a broadcasting reception antenna. The mobile communication antenna may be an antenna for transmitting and receiving a wireless signal of Code Division Multiple Access (CDMA), Wideband Code Division Multiple Access (WCDMA), Global System for Mobile communication (GSM), General Packet Radio Service (GPRS), Enhanced Data GSM Environment (EDGE), Long Term Evolution (LTE), or other communication methods. The short range wireless communication antenna may be a Bluetooth antenna, a Wi-Fi antenna, and the like.

The first communication unit 151 transmits and receives a wireless signal of a first frequency band, the second communication unit 152 transmits and receives a wireless signal of a second frequency band, and the third communication unit 153 transmits and receives a wireless signal of a third frequency band. In this case, the first communication unit 151 to the third communication unit 153 may each be a communication module for transmitting and receiving wireless signals of different frequency bands. For example, the first communication unit 151 may be a short range wireless communication module for supporting short range wireless communication, the second communication unit 152 may be a GPS communication module for processing a GPS signal, and the third communication unit 153 may be a mobile communication module for providing a mobile communication service. Here, the mobile communication module may be a communication module for supporting a mobile communication service of CDMA, WCDMA, GSM, GPRS, EDGE, and LTE methods. The short range wireless communication module may be a Bluetooth communication module for Bluetooth communication and a Wi-Fi communication module for Wi-Fi communication. However, the present invention is not limited thereto. For example, the first communication unit 151 to the third communication unit 153 may be one of a WiBro communication module for processing a WiBro signal, an FM radio communication module for processing an FM radio signal, and a broadcasting communication module for processing a digital broadcasting signal. The first communication unit 151 to the third communication unit 153 each includes a matching unit (not shown), a Radio Frequency (RF) transmitter (not shown) for up-converting a frequency of a signal to be transmitted and amplifying the signal, and an RF receiver (not shown) for down-converting a frequency of a received signal and low-noise amplifying the signal. More particularly, the first communication unit 151 transmits and receives a wireless signal through the first antenna 11, the second communication unit 152 transmits and receives a wireless signal through the second antenna 12, and the third communication unit 153 transmits and receives a wireless signal through an antenna (hereinafter, a combination antenna) effected by a connection of the first antenna 11 and the second antenna 12.

The first switch 141 is positioned between the first antenna 11 and the first communication unit 151 to turn on/off an electrical connection between the first antenna 11 and the first communication unit 151. The second switch 142 is positioned between the second antenna 12 and the second communication unit 152 and the third communication unit 153 to switch the second antenna 12 and the second communication unit 152 or the third communication unit 153 to be electrically connected. The third switch 143 is positioned between the first antenna 11 and the second antenna 12 to turn on/off an electrical connection of the first antenna 11 and the second antenna 12.

As illustrated in FIG. 2, one side of the first switch 141 is connected to one side of the first antenna 11 and one side of the third switch 143, and the other side of the first switch 141 is connected to the first communication unit 151. An input terminal 'In' of the second switch 142 is connected to one side of the second antenna 12 and the other side of the third switch 143, a first output terminal 'Out1' of the second switch 142 is connected to the second communication unit 152, and a second output terminal 'Out2' of the second switch 142 is connected to the third communication unit 153.

Here, when describing a wireless signal path according to activation of the third communication unit 153, if the third communication unit 153 is in an inactive state, the first switch 141 is turned on, the input terminal 'In' and the first output terminal 'Out1' of the second switch 142 are connected, and the third switch 143 is turned off. That is, when the third communication unit 153 is in an inactive state, the mobile terminal 100 forms a first wireless path 1 including the first antenna 11, the first switch 141, and the first communication unit 151 and a second wireless path 2 including the second antenna 12, the second switch 142, and the second communication unit 152.

In contrast, when the third communication unit 153 is in an active, i.e., when transmission and reception of a wireless signal is requested, the first switch 141 is turned off, the third switch 143 is turned on, and the input terminal 'In' and the second output terminal 'Out2' of the second switch 142 are connected. That is, when the third communication unit 153 is in an active state, the mobile terminal 100 forms a third wireless path 3 including the first antenna 11, the second antenna 12, the second switch 142, the third switch 143, and the third communication unit 153.

In FIG. 2, the first switch 141 and the third switch 143 are each a Single Pole Single Throw (SPST) type switch that has one input terminal and one output terminal, and the second switch 142 is a Single Pole Double Throw (SPDT) type switch that has one input terminal and two output terminals. However, the present invention is not limited thereto. That is, it will become apparent to a person of common skill in the art that various types of switches may be applied to any of the first switch 141 to the third switch 143. For example, the first switch 141 and the third switch 143 use an SPDT type switch, and after one of two output terminals is formed in an open state, by connecting an input terminal and an opened output terminal, an off state of the first switch 141 and the third switch 143 may be obtained. Further, the first switch 141 and the third switch 143 may be formed as one SPDT type switch (hereinafter, a fourth switch). In this case, the first antenna 11 is connected to an input terminal of the fourth switch, the first communication unit 151 is connected to a first output terminal of the fourth switch, and input terminals of the second antenna 12 and the second switch 142 are connected to a second output terminal of the fourth switch. In this way, the first switch 141 to the third switch 143 may use various types of switches according to a designer's intention, and it will become apparent to a person of common skill in the art that a switch circuit configuration may be appropriately changed.

The storage unit 120 stores user data as well as a program necessary for a function operation according to an exemplary embodiment of the present invention. For example, the storage unit 120 may store a program for controlling general operations of the mobile terminal 100, an Operating System (OS) for booting the mobile terminal 100, and one or more application programs necessary for other optional functions, for example a camera function, a sound reproduction function, an image or moving picture reproduction function, and a short range wireless communication function of the mobile terminal 100. Further, the storage unit 120 stores user data, for example a text message, a game file, a music file, a movie file, and a phone number generated according to use of the mobile terminal 100. More particularly, the storage unit 120 stores a switch control program for controlling the first switch 141 to the third switch 143 according to a situation or function to be executed by the mobile terminal. Further, the storage unit 120 stores a switch state table for storing an operation state of the first switch 141 to the third switch 143 according to a situation as illustrated in Table 1.

TABLE 1

| | First switch | Second switch | Third switch |
| --- | --- | --- | --- |
| Third communication unit ON | OFF | First state | ON |
| Third communication unit OFF | ON | Second state | OFF |

Referring to Table 1, a state of the first switch 141 to the third switch 143 is changed according to an on/off state of the third communication unit 153. Specifically, when activation (ON) of the third communication unit 153 is requested, the switch control program turns off the first switch 141 to intercept an electrical connection between the first antenna 11 and the first communication unit 151, turns on the third switch 143 to electrically connect the first antenna 11 and the second antenna 12, and switches a state of the second switch 142 to a first state in order to connect a combination antenna that connects the first antenna 11 and the second antenna 12 and the third communication unit 153. When activation of the third communication unit 153 is not requested, the switch control program turns on the first switch 141 to electrically connect the first antenna 11 and the first communication unit 151, switches a state of the second switch 142 to a second state in order to electrically connect the second antenna 12 and the second communication unit 152, and turns off the third switch 143 in order to intercept a connection between the first antenna 11 and the second antenna 12.

The display unit 130 displays information input by a user or information provided to a user as well as various menus of the mobile terminal 100. That is, the display unit 130 provides various screens, for example a standby screen (home screen), a menu screen, a message writing screen, a communication screen, a schedule management screen, an address book screen, and a web page output screen according to use of the mobile terminal 100. Further, the display unit 130 displays a Received Signal Strength Indicator (RSSI) notifying of the strength of a received signal, an indicator notifying of the state of a Wi-Fi function (e.g., on/off), and an indicator notifying of a residual quantity of a battery (not shown) in an indicator area by the control of the controller 110. The indicator may be an image in an icon form. More particularly, the display unit 130 displays an indicator notifying that transmission and reception of at least one of the first communication unit 151 to the third communication unit 153 is limited at one side thereof. For example, when the third communication unit 153 is activated, the display unit 130 may display an indicator notifying that transmission and reception of the first communication unit 151 and the second communication unit 152 is limited at one side of a screen (e.g., an indicator area). Further, when an execution of a function related to the first communication unit 151 and a function related to the second communication unit 152 is requested, the display unit 130 displays an indicator notifying that transmission and reception of the third communication unit 153 is limited at one side of a screen. The display unit 130 may be one of a Liquid Crystal Display (LCD), an Organic Light Emitting Diode (OLED), and an Active Matrix Organic Light Emitting Diode (AMOLED). When the display unit 130 is formed in a touch screen form, the display unit 130 may operate as an input unit (not shown).

The controller 110 controls general operations of the mobile terminal 100 and signal flow between internal elements of the mobile terminal 100. More particularly, the controller 110 determines whether a signal for requesting activation of the third communication unit 153 is input. If a signal for requesting activation of the third communication unit 153 is input, the controller 110 controls the first switch 141 to turn off an electrical connection between the first antenna 11 and the first communication unit 151, controls the second switch 142 to turn on an electrical connection between the second antenna 12 and the third communication unit 153, and controls the third switch 143 to connect the first antenna 11 and the second antenna 12.

If a signal for requesting activation of the third communication unit 153 is not input, the controller 110 controls the first switch 141 to electrically connect the first antenna 11 and the first communication unit 151, switches the second switch 142 to electrically connect the second antenna 12 and the second communication unit 152, and controls the third switch 143 to intercept an electrical connection between the first antenna 11 and the second antenna 12. For this, the controller 110 includes a first control terminal SW1 for controlling switching of the first switch 141, a second control terminal SW2 for controlling switching of the second switch 142, and a third control terminal SW3 for controlling switching of the third switch 143. The first control terminal SW1 to the third control terminal SW3 may each be a General Purpose Input/Output (GPIO) terminal. That is, the controller 110 transmits a control signal for controlling the first switch 141 to the third switch 143 through the GPIO terminal to a control terminal (not shown) of the first switch 141 to the third switch 143.

In the foregoing exemplary embodiment, a case of including three communication units and two antennas is exemplified. However, the present invention is not limited thereto. That is, the present invention can be applied to a case of including a plurality of antennas and a plurality of communication units. In this case, there may be more communication units than the number of antennas. For example, when there are three antennas, there may be 4 to 7 communication units. In this case, when it is assumed that 3 antennas and 7 communication units exist, a first antenna is used for a first communication unit, a second antenna is used for a second communication unit, a third antenna is used for a third communication unit, a first combination antenna that connects the first antenna and the second antenna is used for a fourth communication unit, a second combination antenna that connects the second antenna and the third antenna is used for a fifth communication unit, a third combination antenna that connects the first antenna and the third antenna is used for a sixth communication unit, and a fourth combination antenna that connects the first antenna, the second antenna, and the third antenna is used for a seventh communication unit.

Further, although not shown in FIG. 1, the mobile terminal 100 may selectively include a broadcasting reception module for receiving broadcasting, a digital sound source reproduction module such as an MP3 module, an illumination sensor for measuring outside illumination, a tilt sensor for recognizing a tilt of the mobile terminal 100, a motion sensor, and the like.

Figure 3:
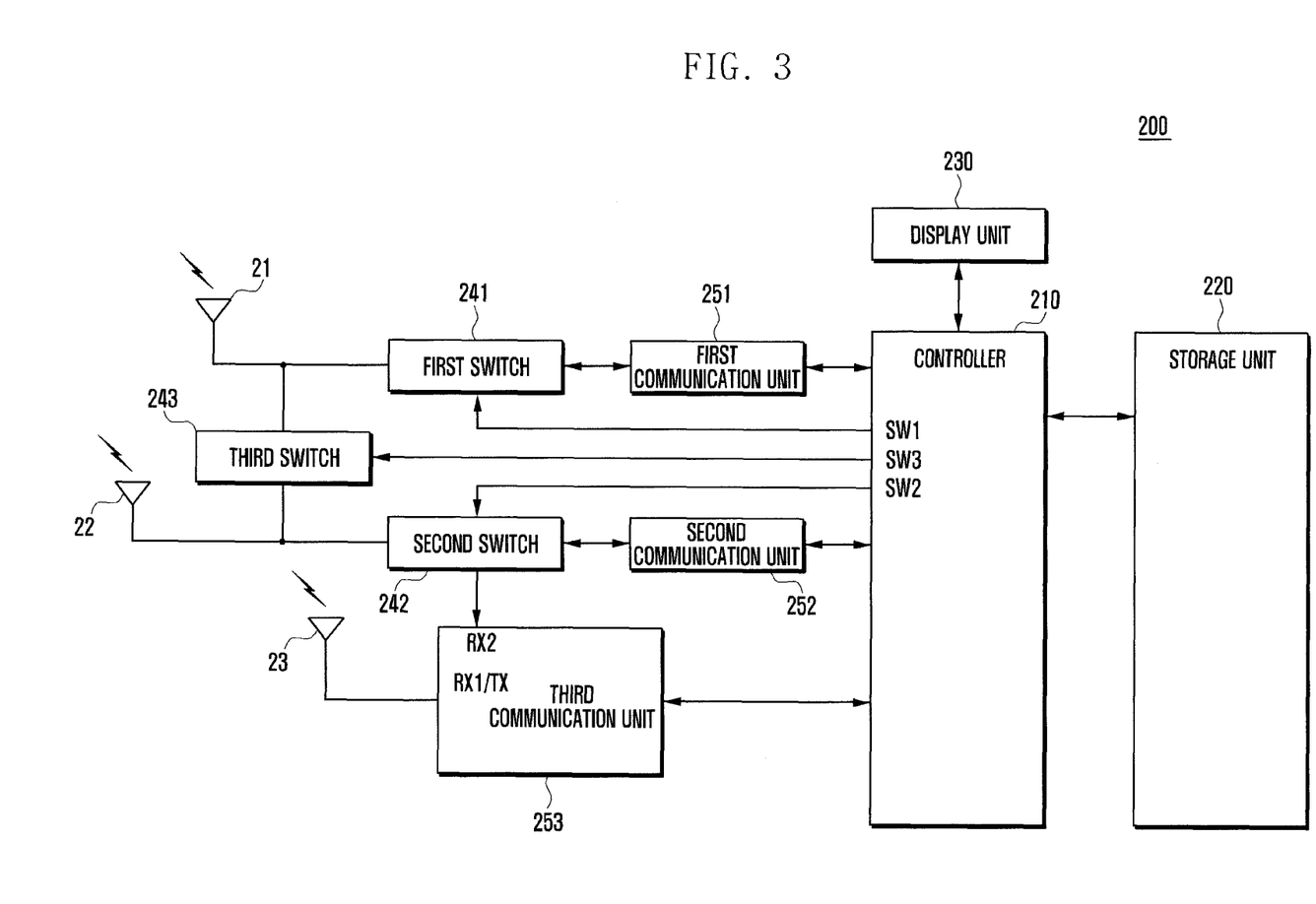
FIG. 3 is a block diagram illustrating a configuration of a mobile terminal according to a second exemplary embodiment of the present invention.

FIG. 3 is a block diagram illustrating a configuration of a mobile terminal according to a second exemplary embodiment of the present invention.

Referring to FIG. 3, a mobile terminal 200 includes a first antenna 21, a second antenna 22, a third antenna 23, a controller 210, a storage unit 220, a display unit 230, a first switch 241, a second switch 242, a third switch 243, a first communication unit 251, a second communication unit 252, and a third communication unit 253.

The mobile terminal 200 illustrated in FIG. 3 is different from the mobile terminal 100 illustrated in FIGS. 1 and 2 in that the third antenna 23 is further included in a configuration of the mobile terminal 200 and the third communication unit 253 is a communication unit for diversity reception. More specifically, the third antenna 23 transmits and receives a wireless signal of a third frequency band. The third antenna 23 is connected to transmission and reception terminals Rx1/Tx of the third communication unit 253, and a second output terminal of the second switch 242 is connected to a reception terminal Rx2 of the third communication unit 253. In this way, the third communication unit 253 transmits and receives a wireless signal through only the third antenna 23, or transmits and receives a wireless signal through the third antenna 23 and the combination antenna (diversity antenna formed with the first antenna 21+the second antenna 22). Here, the diversity antenna is a well-known technology and therefore a description thereof is omitted.

The controller 210 periodically determines the intensity of a receiving signal of the third communication unit 253, and, if the intensity of the receiving signal of the third communication unit 253 is equal to or greater than a preset reference value, controls to transmit and receive a wireless signal using only the third antenna 23. If the intensity of the receiving signal of the third communication unit 253 is less than a preset reference value, the controller 210 controls the first switch 241 to the third switch 243 to connect the first antenna 21 and the second antenna 22 and controls to transmit and receive a wireless signal by forming the third antenna 23 and the combination antenna in a diversity antenna. The mobile terminal 200 has substantially the same configuration as that of the mobile terminal 100 except for the above-described difference. Therefore, a description of other constituent elements of the mobile terminal 200 is omitted. This is to avoid a repetition description of the same constituent element.

Figure 4:
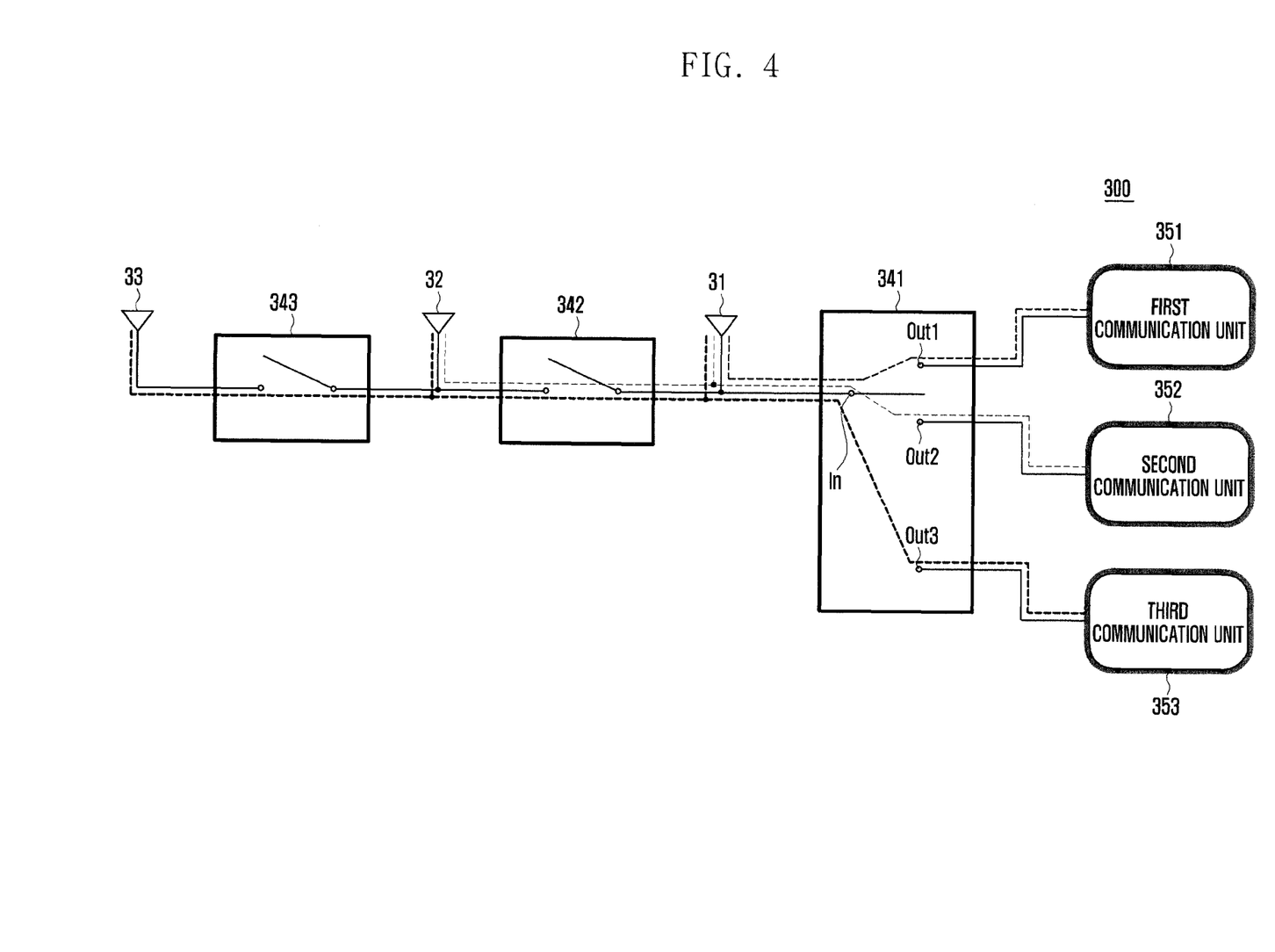
FIG. 4 is a block diagram illustrating a configuration of an antenna device of a mobile terminal according to a third exemplary embodiment of the present invention.

FIG. 4 is a block diagram illustrating a configuration of an antenna device of a mobile terminal according to a third exemplary embodiment of the present invention.

Referring to FIG. 4, a mobile terminal 300 includes a first antenna 31 for transmitting and receiving a wireless signal of a first frequency band. A second antenna 32 and a third antenna 33 are dummy antennas operating only when connected to the first antenna 31.

A first switch 341 may be an SPxT switch having one input terminal and a plurality of output terminals (e.g., 3). A second switch 342 and a third switch 343 may each be an SPST switch. An input terminal 'In' of the first switch 341 is connected to the first antenna 31, a first output terminal 'Out1' of the first switch 341 is connected to a first communication unit 351, a second output terminal 'Out2' of the first switch 341 is connected to a second communication unit 352, and a third output terminal 'Out3' of the first switch 341 is connected to a third communication unit 353.

The second switch 342 is positioned between the first antenna 31 and the second antenna 32 to turn on/off an electrical connection of the first antenna 31 and the second antenna 32. The third switch 343 is positioned between the second antenna 32 and the third antenna 33 to turn on/off an electrical connection of the second antenna 32 and the third antenna 33.

In order to transmit and receive a wireless signal of a first frequency band, the mobile terminal 300 turns off the second switch 342 and the third switch 343 and switches the first switch 341 to connect the first antenna 31 and the first communication unit 351. Further, in order to transmit and receive a wireless signal of a second frequency band, the mobile terminal 300 turns off the third switch 343, connects the first antenna 31 and the second antenna 32 by turning on the second switch 342, and switches the first switch 341 to connect the connected first antenna 31 and second antenna 32 to the second communication unit 352. Further, in order to transmit and receive a wireless signal of the third frequency band, the mobile terminal 300 connects the first antenna 31, the second antenna 32, and the third antenna 33 and switches the first switch 341 to connect the connected first antenna 31 to third antenna 33 to the third communication unit 353 by turning on the second switch 342 and the third switch 343.

In this way, an antenna device of the mobile terminal 300 includes a first antenna 31 for transmitting and receiving a wireless signal of a first frequency band and a plurality of dummy antennas that are coupled in series to the first antenna 31 and transmits and receives a wireless signal of a new frequency band by coupling in series the first antenna 31 and the dummy antennas 32 and 33, as needed. When using the dummy antenna arrangement of the present invention, if it is assumed that an antenna of 30 mm, an antenna of 70 mm, and an antenna of 100 mm are necessary for transmission of signals of specific frequencies, the present invention eliminates the need for individual antennas of 30 mm, 70 mm, and 100 mm in length and instead includes an antenna of 30 mm, a dummy antenna of 40 mm, and a dummy antenna of 30 mm. Thus, antenna mounting space can be more easily secured.

Figure 5:
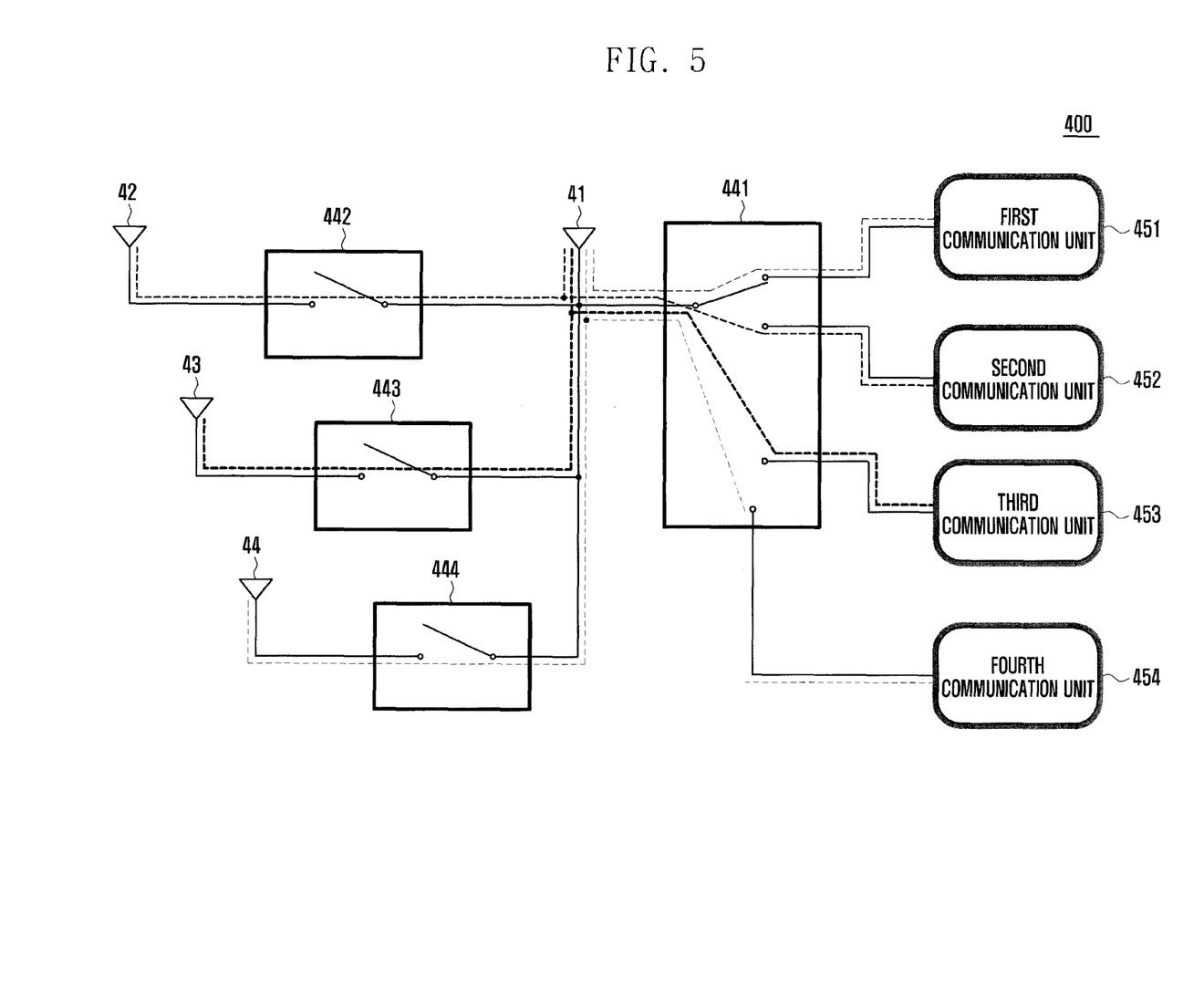
FIG. 5 is a block diagram illustrating a configuration of an antenna device of a mobile terminal according to a fourth exemplary embodiment of the present invention.

FIG. 5 is a block diagram illustrating a configuration of an antenna device of a mobile terminal according to a fourth exemplary embodiment of the present invention.

Referring to FIG. 5, a mobile terminal 400 includes a first antenna 41 for transmitting and receiving a wireless signal of a first frequency band and a plurality of dummy antennas 42, 43, and 44 that are coupled in parallel to the first antenna 41. That is, in order to transmit and receive a wireless signal of a first frequency band, the mobile terminal 400 turns off a second switch 442, third switch 443, and fourth switch 444, and switches a first switch 441 to connect the first antenna 41 and a first communication unit 451. In order to transmit and receive a wireless signal of a second frequency band, the mobile terminal 400 turns on the second switch 442, turns off the third switch 443 and the fourth switch 444, and switches the first switch 441 to connect the first antenna 41 and a second communication unit 452. That is, the second communication unit 452 of the mobile terminal 400 transmits and receives a wireless signal of a second frequency band through the first antenna 41 and the second antenna 42 electrically connected through the second switch 442. Further, in order to transmit and receive a wireless signal of a third frequency band, the mobile terminal 400 turns on the third switch 443, turns off the second switch 442 and the fourth switch 444, and switches the first switch 441 to connect the first antenna 41 and a third communication unit 453. That is, the third communication unit 453 of the mobile terminal 400 transmits and receives a wireless signal of the third frequency band through the first antenna 41 and the third antenna 43 electrically connected through the third switch 443. Further, in order to transmit and receive a wireless signal of a fourth frequency band, the mobile terminal 400 turns off the second switch 442 and the third switch 443, turns on the fourth switch 444, and switches the first switch 441 to connect the first antenna 41 and a fourth communication unit 454. That is, the fourth communication unit 454 of the mobile terminal 400 transmits and receives a wireless signal of the fourth frequency band through the first antenna 41 and the fourth antenna 44 electrically connected through the fourth switch 444.

The mobile terminal 400 can more easily secure antenna mounting space with the same reason as that of the third exemplary embodiment.

Figure 6:
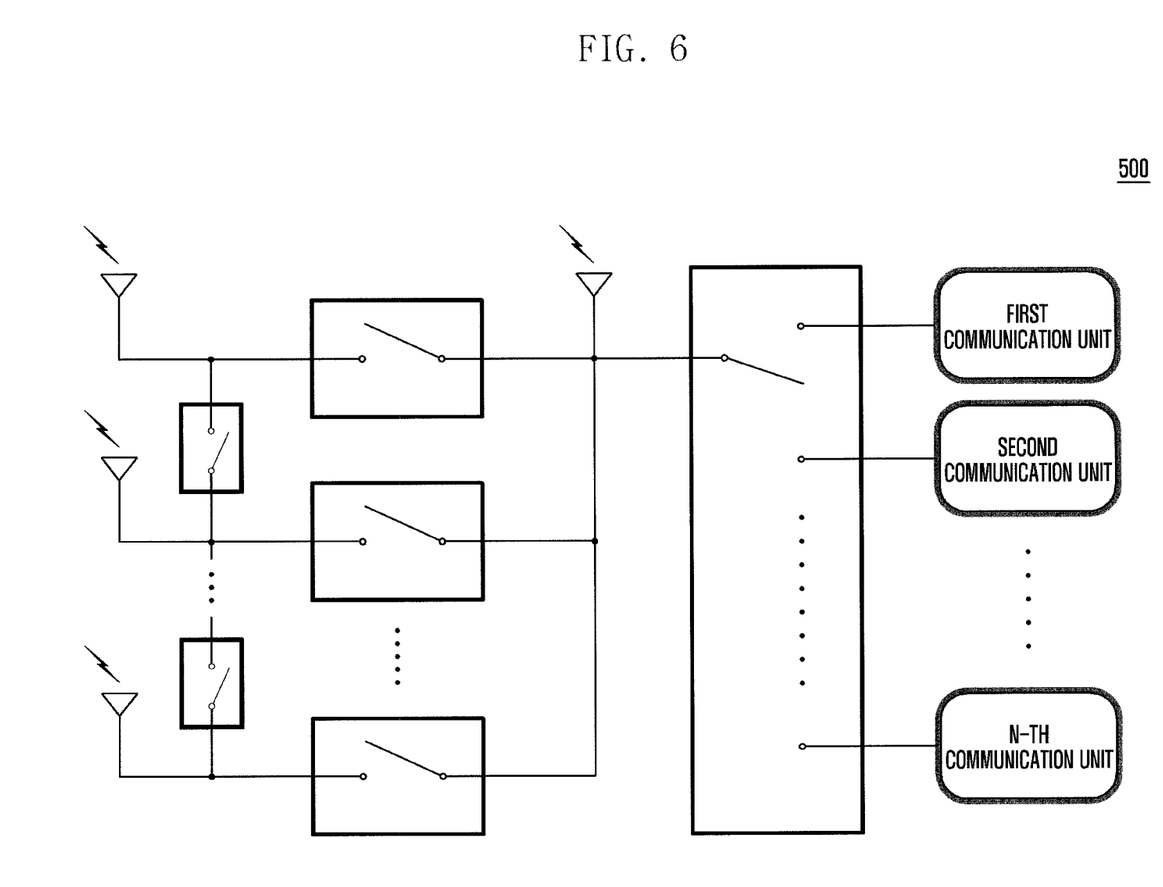
FIG. 6 is a block diagram illustrating a configuration of an antenna device of a mobile terminal according to a fifth exemplary embodiment of the present invention.

FIG. 6 is a block diagram illustrating a configuration of an antenna device of a mobile terminal according to a fifth exemplary embodiment of the present invention.

Referring to FIG. 6, a mobile terminal 500 includes a plurality of switches that can be coupled in series and in parallel, a plurality of dummy antennas, and an antenna for transmitting and receiving a wireless signal of a first frequency band. The mobile terminal 500 has a configuration similar to the mobile terminals of FIGS. 4 and 5 and therefore a description of constituent elements is omitted.

With the mobile terminal 500, when a plurality of dummy antennas are connected in series and in parallel, a plurality of combination antennas that can receive a wireless signal of a specific frequency band may exist. For example, when it is assumed that the mobile terminal 500 includes an antenna of 30 mm and dummy antennas having lengths of 20 mm, 40 mm, 50 mm, and 70 mm, and needs to form an antenna having a length of 100 mm, the mobile terminal 500 may form the antenna having a length of 100 mm by connecting the antenna of 30 mm and the dummy antennas of 20 mm and 50 mm, or by connecting the antenna of 30 mm and the dummy antenna of 70 mm. Thus, the mobile terminal 500 is able to transmit and receive a wireless signal of a specific frequency band through two combinable antennas.

As described above, when a plurality of antenna combinations that can transmit and receive a wireless signal of a specific frequency band exist, a controller (not shown) of the mobile terminal 500 measures the intensity of a receiving signal for each combination of antennas and controls to transmit and receive a wireless signal using the antenna combination having the highest receiving signal intensity as determined by the measurements. Further, if the intensity of a receiving signal of a specific communication unit is less than a preset reference value, the controller (not shown) of the mobile terminal 500 measures the intensity of a receiving signal of each of antenna combination that can transmit and receive a wireless signal of a frequency band of the specific communication unit and controls to transmit and receive a wireless signal through an antenna combination having the highest receiving signal intensity. For this purpose, a switch state table stored at a storage unit (not shown) of the mobile terminal 500 stores an operation state of each switch for constituting at least one combination antenna for transmitting and receiving a wireless signal of a specific frequency band.

In FIGS. 4 to 6, at least one dummy antenna is connected in series and in parallel to one antenna, but the present invention is not limited thereto. That is, when the mobile terminal includes a plurality of antennas (e.g., first antenna to third antenna of FIG. 2), the at least one dummy antenna may be connected with at least one connection method of series and parallel to one of the plurality of antennas.

As described above, an antenna device of a mobile terminal according to exemplary embodiments of the present invention can receive a wireless signal of a new frequency band by appropriately connecting a plurality of antennas through a switch. That is, the antenna device can receive a wireless signal of a desired frequency band by appropriately connecting existing antennas through a switch without adding a separate antenna. Thereby, a mounting space shortage problem of an antenna can be addressed, and a wireless performance of the mobile terminal can be improved.

Further, by selectively forming a wireless path with an antenna combination appropriate for a communication environment among combinable antennas, an optimal wireless performance can be always provided.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An antenna device of a mobile terminal, the antenna device comprising:
    a first communication unit for transmitting and receiving a wireless signal of a first frequency band through a first antenna;
    a second communication unit for transmitting and receiving a wireless signal of a second frequency band through a second antenna;
    a third communication unit for transmitting and receiving a wireless signal of a third frequency band through a combination antenna generated by connecting the first antenna and the second antenna;
    a first switch for turning on/off an electrical connection between the first antenna and the first communication unit;
    a second switch for switching to electrically connect the second antenna and the second communication unit or the third communication unit;
    a third switch for turning on/off an electrical connection of the first antenna and the second antenna; and
    a controller for determining whether a signal for requesting activation of the third communication unit is input, for controlling, if a signal for requesting activation of the third communication unit is input, the first switch to turn off an electrical connection between the first antenna and the first communication unit, for controlling the second switch to turn on an electrical connection between the second antenna and the third communication unit, and for controlling the third switch to connect the first antenna and the second antenna.

2. The antenna device of claim 1, wherein the controller controls the first switch to electrically connect the first antenna and the first communication unit, controls the second switch to electrically connect the second antenna and the second communication unit, and controls the third switch to open an electrical connection between the first antenna and the second antenna, when de-activation of the third communication unit is requested.

3. The antenna device of claim 1, further comprising a third antenna for transmitting and receiving the third frequency band with a wireless signal and connected to the third communication unit, when the third communication unit supports diversity reception,
    wherein the third antenna and the combination antenna operates as a diversity antenna.

4. The antenna device of claim 3, wherein the controller periodically determines intensity of a receiving signal of the third communication unit, and, if intensity of the receiving signal of the third communication unit is equal to or larger than a preset reference value, the controller controls to transmit and receive a wireless signal through the third antenna, and if intensity of the receiving signal of the third communication unit is less than a preset reference value, the controller controls to transmit and receive a wireless signal through a diversity antenna formed with the third antenna and the combination antenna.

5. The antenna device of claim 1, further comprising at least one dummy antenna connected with at least one method of series and parallel to one of the antennas.

6. The antenna device of claim 5, wherein at least one combination antenna is generated by combining the antennas and the at least one dummy antenna, and
    when a plurality of combination antennas that can transmit and receive a wireless signal of a specific frequency band exist, the controller controls to measure intensity of a receiving signal of each of the combination antennas and to transmit and receive a wireless signal through a combination antenna having a highest receiving signal intensity as a measurement result.

7. The antenna device of claim 6, further comprising a storage unit for storing a switch state table that stores each operation state of switches for constituting at least one combination antenna that receives a wireless signal of the specific frequency band.

8. The antenna device of claim 1, wherein the first switch and the third switch each comprise a Single Pole Single Throw type switch and the second switch comprises a Single Pole Double Throw type switch.

9. The antenna device of claim 1, wherein each of the first switch, the second switch, and the third switch comprise a Single Pole Double Throw type switch.

10. The antenna device of claim 1, wherein the first switch and the third switch are implemented by a Single Pole Double Throw type switch and the second switch comprises a Single Pole Double Throw type switch.

11. The antenna device of claim 1, wherein the first antenna and the second antenna each have different lengths.

12. An antenna device of a mobile terminal, the antenna device comprising:
- a first communication unit for transmitting and receiving a wireless signal of a first frequency band;
- a second communication unit for transmitting and receiving a wireless signal of a second frequency band;
- a third communication unit for transmitting and receiving a wireless signal of a third frequency band;
- a first antenna;
- a second antenna;
- a third antenna;
- a first switch for selectively connecting between the first antenna and one of the first communication unit, the second communication unit, and the third communication unit;
- a second switch for connecting between the first antenna and the second antenna;
- a third switch for connecting between the second antenna and the third antenna; and
- a controller for selectively operating the first switch, the second switch and the third switch depending on an operating mode of the mobile terminal.

13. The antenna device of claim 12, wherein the controller controls to open the second switch and the third switch when the mobile terminal operates using the first communication unit.

14. The antenna device of claim 12, wherein the controller controls to close the second switch and open the third switch when the mobile terminal operates using the second communication unit.

15. The antenna device of claim 12, wherein the controller controls to close the second switch and the third switch when the mobile terminal operates using the third communication unit.

16. The antenna device of claim 12, wherein the first antenna, the second antenna and the third antenna have different lengths.

17. The antenna device of claim 12, wherein the second antenna and the third antenna are each formed in series with the first antenna.

18. The antenna device of claim 12, wherein the second antenna and the third antenna are each formed in parallel with the first antenna.

* * * * *